(No Model.)

G. F. HAVEN & S. H. POST.
BELT PULLEY.

No. 379,111. Patented Mar. 6, 1888.

WITNESSES
H. B. Harris
Phill. Masi

INVENTORS
Geo. F. Haven,
S. H. Post,
by E. W. Anderson.
Attorney

UNITED STATES PATENT OFFICE.

GEORGE F. HAVEN AND SEYMOUR H. POST, OF NEWARK, NEW JERSEY.

BELT-PULLEY.

SPECIFICATION forming part of Letters Patent No. 379,111, dated March 6, 1888.

Application filed June 25, 1887. Serial No. 242,492. (No model.)

*To all whom it may concern:*

Be it known that we, GEORGE F. HAVEN and SEYMOUR H. POST, citizens of the United States, and residents of Newark, in the county of Essex and State of New Jersey, have invented certain new and useful Improvements in Belt-Pulleys; and we do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
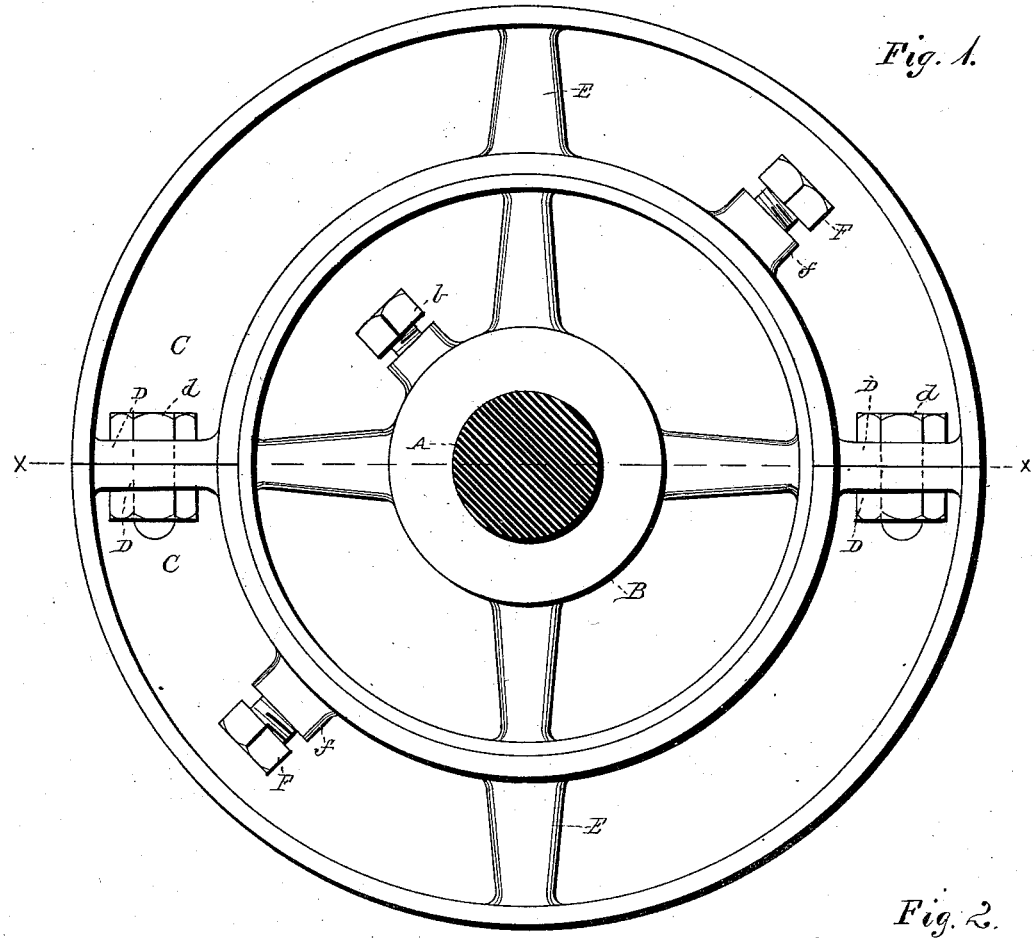
Figure 2:
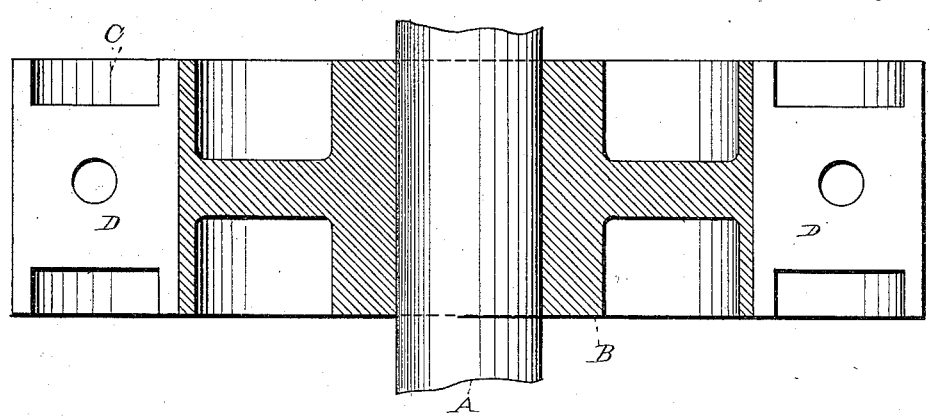

Figure 1 of the drawings is an end view of a pulley with our improved expansion-pulley attached. Fig. 2 is a section on line $xx$, Fig. 1.

The invention relates to improvements in expansion-pulleys, the object being to provide ready and inexpensive means of altering the diameter and width of bearing thereof; and it consists in the construction and novel combination of parts, as hereinafter set forth.

Referring to the drawings by letter, A designates a shaft, having upon it the pulley B, secured thereupon in any desired manner, as by a set-screw, $b$, passing through its hub and engaging on the shaft.

C C are detachable segmental pieces having an inside periphery when put together that fits on the periphery of the pulley B. The said parts C are constructed with different outside peripheries, and the said part C may be replaced by corresponding segments having a greater or less width of band-bearing surface. The segmental pieces are provided with meeting lugs D D at their ends, through which they are connected together by bolts $d$. The inside and outside periphery of each segment are connected by a central longitudinal web, E, from which the lugs D stand outward on each side, so that the segments are secured by bolts $d$ on each side of the webs.

F F are set-screws passing through tapped openings in the bosses $f f$ on the outer surface of the inner peripheries of the segments, and securing the connected segments to the periphery of the pulley B, thus causing them to turn therewith as one wheel and drive a belt when required. By means of using segments of greater or less diameter larger or smaller wheels may be thus temporarily constructed, and wheels of greater or less bearing-surface may be temporarily constructed by using segments of greater or less tread.

Having described our invention, we claim—

1. A pulley constructed of a central wheel secured to the shaft, and detachable segmental pieces fitting thereon, secured together by bolts at their ends and on the central wheel by set-screws, substantially as specified.

2. A pulley consisting of the central wheel or disk detachably secured on the shaft by a set-screw, the detachable segmental pieces C, provided with the outer and inner peripheries connected by the central longitudinal webs, E, the lugs D, bosses $f$, the bolts $d$, and set-screws F, substantially as specified.

In testimony whereof we affix our signatures in presence of two witnesses.

GEO. F. HAVEN.
SEYMOUR H. POST.

Witnesses:
L. M. WILCOX,
W. H. DYKEMAN.